(12) United States Patent
Fjeldheim

(10) Patent No.: US 12,296,718 B2
(45) Date of Patent: May 13, 2025

(54) SYSTEM AND A METHOD FOR HARVESTING ENERGY FROM A CONTAINER HANDLING VEHICLE

(71) Applicant: Autostore Technology AS, Nedre Vats (NO)

(72) Inventor: Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 913 days.

(21) Appl. No.: 17/432,045

(22) PCT Filed: Feb. 14, 2020

(86) PCT No.: PCT/EP2020/053909
§ 371 (c)(1),
(2) Date: Aug. 18, 2021

(87) PCT Pub. No.: WO2020/169474
PCT Pub. Date: Aug. 27, 2020

(65) Prior Publication Data
US 2022/0161662 A1 May 26, 2022

(30) Foreign Application Priority Data

Feb. 18, 2019 (NO) .................................. 20190219

(51) Int. Cl.
*B60L 7/10* (2006.01)
*B60L 50/40* (2019.01)
(Continued)

(52) U.S. Cl.
CPC .................. *B60L 7/10* (2013.01); *B60L 50/40* (2019.02); *B60L 50/60* (2019.02); *B60L 53/80* (2019.02);
(Continued)

(58) Field of Classification Search
CPC .. B60L 7/10; B60L 50/40; B60L 50/60; B60L 53/80; B60L 2200/26; B60L 2200/36; B65G 1/0464
See application file for complete search history.

(56) References Cited

U.S. PATENT DOCUMENTS 3,947,744 A 3/1976 Grace et al.
2008/0290842 A1 11/2008 Davis et al.
(Continued)

FOREIGN PATENT DOCUMENTS

CN 105814766 A 7/2016
CN 105899398 A 8/2016
(Continued)

OTHER PUBLICATIONS

Office Action issued in the counterpart European Patent Application No. 20706168.0, mailed on Sep. 12, 2022 (3 pages).
(Continued)

*Primary Examiner* — Robert J McCarry, Jr.
(74) *Attorney, Agent, or Firm* — Baker Botts L.L.P.

(57) ABSTRACT

A container-handling vehicle for handling storage containers in a three-dimensional grid of an underlying storage system, comprising: at least one lifting device for lifting storage containers from and lowering storage containers to the underlying storage system, said lifting device comprises a lifting frame for gripping a storage container, a winch system for lifting and lowering the lifting frame, a motor to drive the winch system and a driver circuit with a controller controlling the motor; and at least first and second rechargeable power sources for providing power to the motor, wherein the driver circuit further comprises a regenerative energy circuit configured to harvest energy from the motor when the lifting frame is lowered into the storage system and where the driver circuit is configured to direct harvested (Continued)

energy to the rechargeable power sources according to levels of charge in the rechargeable power sources.

10 Claims, 5 Drawing Sheets

(51) Int. Cl.
    *B60L 50/60*         (2019.01)
    *B60L 53/80*         (2019.01)
    *B65G 1/04*          (2006.01)

(52) U.S. Cl.
    CPC ........ *B65G 1/0464* (2013.01); *B60L 2200/26* (2013.01); *B60L 2200/36* (2013.01)

(56) References Cited

U.S. PATENT DOCUMENTS

| | | |
|---|---|---|
| 2016/0288663 A1 | 10/2016 | Hikiri et al. |
| 2016/0297307 A1 | 10/2016 | Hinterberger et al. |
| 2016/0325932 A1* | 11/2016 | Hognaland ............ B60L 15/40 |

FOREIGN PATENT DOCUMENTS

| | | | |
|---|---|---|---|
| DE | 102015004701 A1 | 10/2016 | |
| EP | 2755100 A1 * | 7/2014 | .......... B60L 11/1837 |
| JP | 2008081219 A | 4/2008 | |
| JP | 2012076859 A | 4/2012 | |
| JP | 2012218934 A | 11/2012 | |
| JP | 2016-25723 A | 2/2016 | |
| NO | 317366 B1 | 10/2004 | |
| WO | 2012/051696 A1 | 4/2012 | |
| WO | 2014/090684 A1 | 6/2014 | |
| WO | 2015/071970 A1 | 5/2015 | |
| WO | 2015/193278 A1 | 12/2015 | |
| WO | 2018/210923 A1 | 11/2018 | |

OTHER PUBLICATIONS

Office Action issued in the counterpart Chinese Application No. 202080015030.3, mailed Feb. 3, 2024 (15 pages).
Office Action issued in the counterpart Japanese Application No. 2021-547851, mailed Feb. 20, 2024 (9 pages).
Office Action issued in counterpart Japanese Patent Application No. 2021-547851 mailed on Nov. 29, 2023 (4 pages).
T.K. Rognan, "Office action in patent application 20190219," Norwegian Industrial Property Office, Oslo, Norway, Jun. 10, 2024, 6 pages (in English).
Zhou Shanlin, Office Action for Chinese Patent Application No. CN2020800150303, mailed Aug. 15, 2024, 13 pages, pub. by SIPO, Beijing, China.
Kenichi Matsunaga, Final Office Action for Japanese Patent Application No. JP2021547851, mailed Aug. 6, 2024, 10 pages, pub. by JPO, Japan.
Zhou Shanlin, Third Office Action for Chinese Patent Application No. CN2020800150303, mailed Oct. 30, 2024, 11 pages, pub. by SIPO, Beijing, China.
International Search Report issued in PCT/EP2020/053909 on Apr. 17, 2020 (4 pages).
Written Opinion of the International Searching Authority issued in PCT/EP2020/053909 on Apr. 17, 2020 (8 pages).
International Preliminary Report on Patentability from PCT/EP2020/053909 on May 28, 2021 (26 pages).
Norwegian Search Report issued in No. 20190219 mailed on Sep. 18, 2019 (2 pages).

* cited by examiner

SYSTEM AND A METHOD FOR HARVESTING ENERGY FROM A CONTAINER HANDLING VEHICLE

TECHNICAL FIELD

The present invention regards a system and a method for harvesting energy from a container handling vehicle powered by a rechargeable battery and handling storage containers in a three-dimensional grid of an underlying storage system. More specifically a system and a method for harvesting energy from a container handling vehicle, powered by rechargeable power sources and handling storage containers in a three-dimensional grid of an underlying storage system where charging levels of the power sources are monitored and controlled.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises several upright members 102 and several horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage grid 104, on which rail system 108 a plurality of container handling vehicles 201, 301 are operated to raise storage containers 106 from, and lower storage containers 106 into, the storage columns 105, and to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. In this way, the rail system 108 defines grid columns 112 above which the container handling vehicles 201, 301 can move laterally above the storage columns 105, i.e. in a plane which is parallel to the horizontal X-Y plane.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. Each set of wheels 201b, 301b, 201c, 301c can be lifted and lowered, so that the first set of wheels 201b,301b and/or the second set of wheels 201c, 301c can be engaged with the respective set of rails 110, 111 at any one time.

Each prior art container handling vehicle 201, 301 also comprises a lifting device 302 for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO2015/193278A1, the contents of which are incorporated herein by reference. The term 'lateral' used herein may mean 'horizontal'.

Alternatively, the central cavity container handling vehicles 201 may have a footprint which is larger than the lateral area defined by a grid column 112, e.g. as is disclosed in WO2014/090684A1.

In the X and Y directions, neighboring grid cells are arranged in contact with each other such that there is no space there-between.

In a storage grid 104, most of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201, 301 can drop off and/or pick up storage containers 106 so that they can be transported to an access station (not shown) where the storage containers 106 can be accessed from outside of the grid 104 or transferred out of or into the grid 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage containers 106 may be placed in a random or dedicated grid column 112 within the storage grid 104, then picked up by any container handling vehicle and transported to a port 119, 120 for further transportation to an access station. Note that the term 'tilted' means transportation of storage containers 106 having a general transportation orientation somewhere between horizontal and vertical.

When a storage container 106 stored in the grid 104 disclosed in FIG. 1 is to be accessed, one of the container handling vehicles 201, 301 is instructed to retrieve the target storage container 106 from its position in the grid 104 and transport it to the drop-off port 119. This operation involves moving the container handling vehicle 201, 301 to a grid location above the storage column 105 in which the target storage container 106 is positioned, retrieving the storage container 106 from the storage column 105 using the container handling vehicle's 201, 301 lifting devices (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201, 301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201, 301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system which typically is computerized and which typically comprises a database for keeping track of the storage containers 106.

It is a known concept to harvest energy from electromotors while they are working in reverse. This is called regenerative braking and is an energy recovery mechanism which slows an object (e.g. like a car) down by converting its kinetic energy into electric energy. The harvested electric energy can be stored in a rechargeable power source like a battery or a capacitor. By using regenerative braking and storing the generated electric energy in a rechargeable power source the operational time of the rechargeable power source is prolonged before it must be recharged.

A preferred rechargeable power source used to power vehicles is lithium-ion batteries. They are preferred due to their high energy density and low self-discharge. Further they can be recharged multiple times with little loss of charge capability.

However, a problem with using Li-ion batteries is that they must be charged correctly. Li-ion batteries can be a safety hazard since they contain a flammable electrolyte. A battery cell charged too quickly could cause a short circuit, leading to explosions and fires. Further, if a Li-ion battery is overcharged, lithium ions can build up on the anode as metallic lithium. This is called lithium plating. Lithium plating degrades the battery's life and durability. It can also lead to a short circuit which again might lead to a fire. Overcharging of Li-ion batteries is a known problem when using regenerative braking in vehicles.

An alternative rechargeable power source is capacitors, and preferably supercapacitors. They have the benefit of being able to take a large amount of charge quickly without the risk of overcharging. However, a problem with capacitors is that they have low energy density and that they have a high level of internal leakage current. The result is that they must be charged often in order to keep their charge level and that it requires many capacitors to be able to give the required amount of power to manoeuvre the container handling vehicle. This also requires a lot of space and unnecessary weight.

It would be desirable to use regenerative braking in the system described in FIG. 1-3 to regenerate energy when e.g. the container handling vehicles lowers the lifting frames into the underlying storage grid. It is an object of the present invention to overcome the problems mentioned above with damaging the battery and to ensure that the regenerative braking does not overcharge the battery.

SUMMARY OF THE INVENTION

The present invention is set forth and characterized in the independent claims, while the dependent claims describe other characteristics of the invention.

The invention is defined by a container-handling vehicle for handling storage containers in a three-dimensional grid of an underlying storage system, comprising at least one lifting device for lifting storage containers from and lowering storage containers to the underlying storage system, said lifting device comprises a lifting frame for gripping a storage container, a winch system for lifting and lowering the lifting frame, a motor to drive the winch system and a driver circuit with a controller controlling the motor; and at least first and second rechargeable power sources for providing power to the motor, wherein the driver circuit further comprises a regenerative energy circuit configured to harvest energy from the motor when the lifting frame is lowered into the storage system and where the driver circuit is configured to control and direct harvested energy to the rechargeable power sources according to preset levels of charge in the rechargeable power sources.

The harvested energy is directed to either the first rechargeable power source or the second rechargeable power source. In a preferred embodiment of the present invention the first rechargeable power source is a rechargeable battery and the second rechargeable power source is a capacitor. The capacitor may be a supercapacitor.

Supercapacitors are divided into two different categories, one called double layer capacitors which uses electrostatically charge storage and the other called pseudocapacitors which uses electrochemical charge storage. A further sub category is hybrid capacitors which uses both electrostatically and electrochemically storage capacity.

To keep track of the charge level of the two rechargeable power sources of the present invention the driver circuit is in communication with a charge sensor connected to the first and/or second rechargeable power sources. The charge sensor keeps track of the charging capacity of the rechargeable power sources and communicates its reading to the driver circuit which in turn decides where the harvested energy is directed. The energy is directed to either of the two rechargeable power sources according to their levels of charge.

If the rechargeable battery is a Li-ion battery it keeps its charge capacity best if the battery is kept within 25%-75% of its charging capacity. So, in order to maintain the battery's life best, the charge of the battery has to be kept below 75% and above 25% of its charging capacity. Hence if the battery has a charge level below 75%, the harvested energy is directed to the Li-ion battery. If the charge of the battery is above 75% the harvested energy is directed to the capacitor.

Alternatively, in order to avoid the buildup of lithium plating, a safety measure is built into the system. If the battery is in danger of being overcharged the driver circuit directs the harvested energy to the capacitor.

In an embodiment of the present invention the container handling vehicle exchanges its battery when the battery is discharged to below a prescribed level. This reduces the down time for a container handling vehicle to almost nothing. However, the empty battery and the fully charged battery may not necessarily be located at the same charging station. So, in order to move the container handling vehicle from a drop off charging station to a pick-up charging station, the container handling vehicle uses power from the capacitor. It is therefore necessary to ensure that the capacitor has enough stored energy to maneuver the vehicle between the two charging stations. Consequently, if the charge level of the capacitor is determined to be dropping below a set threshold level the harvested energy may be directed to the capacitor.

The invention is further defined by a method for harvesting energy when a container-handling vehicle is handling a storage container in a three-dimensional grid of an underlying storage system, wherein said vehicle comprises a vehicle body with at least a first set of wheels for moving the container-handling vehicle in a first direction, at least one rechargeable battery, and at least one capacitor, a control system for controlling the charging level of the rechargeable battery and the capacitor, at least one lifting device for lifting storage containers from and lowering storage containers to the underlying storage system, wherein said lifting device comprises a lifting frame for gripping a storage container, a winch system for lifting and lowering the lifting frame, a motor to drive the winch system and a driver circuit with a controller controlling the motor; the method comprises the following steps:

connecting motor and regenerative charging circuit for harvesting the energy to the lifting device;

lowering the lifting device into the underlaying storage system, directing harvested energy to the rechargeable battery and/or the capacitor by means of the control system.

In a further alternative embodiment of the present invention energy is also harvested from the deceleration of the container handling vehicle itself.

An advantage of the invention is that it provides optimal maintenance of the rechargeable power sources while at the same time ensuring optimal storage of energy harvested while the container handling vehicle is in operation.

BRIEF DESCRIPTION OF THE DRAWINGS

The following drawings are appended to facilitate the understanding of the invention. The drawings show embodiments of the invention, which will now be described by way of example only, where.

DETAILED DESCRIPTION

In the following, the invention will be discussed in more detail with reference to the appended drawings. It should be understood, however, that the drawings are not intended to limit the invention to the subject-matter depicted.

A typical prior art automated storage and retrieval system with a framework structure 100 was described in the background section above.

The container handling vehicle rail system 108 allows the container handling vehicles 201 to move horizontally between different grid locations, where each grid location is associated with a grid cell.

Figure 1:
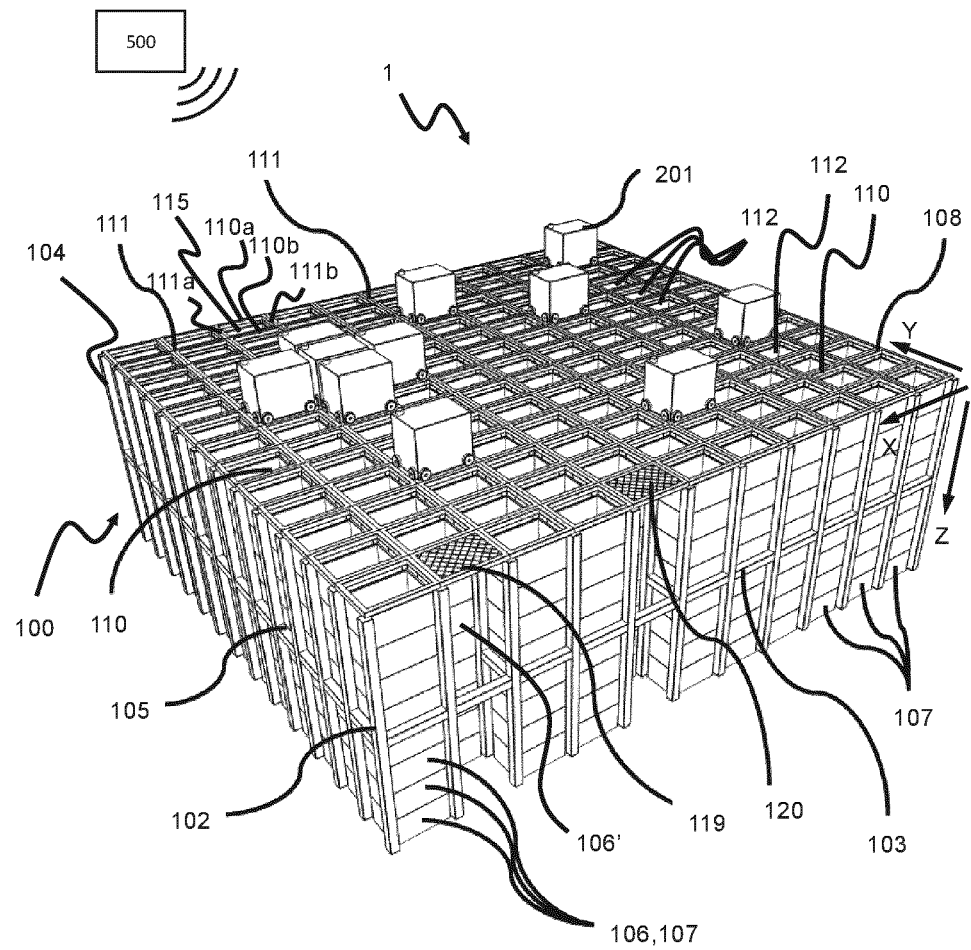
FIG. 1 is a perspective view of a grid of a prior art automated storage and retrieval system.

In FIG. 1, the storage grid 104 is shown with a height of eight grid cells. It is understood, however, that the storage grid 104 can in principle be of any size. The storage grid 104 can be considerably wider and/or longer than disclosed in FIG. 1. For example, the grid 104 may have a horizontal extent of more than 700×700 storage columns 105. Also, the grid 104 can be considerably deeper than disclosed in FIG. 1. For example, the storage grid 104 may be more than twelve grid cells deep, i.e. in the Z direction indicated in FIG. 1.

The container vehicles 201 can be of any type known in the art, e.g. any one of the automated container handling vehicles disclosed in WO2014/090684 A1, in NO317366 or in WO2015/193278A1. The method and control system for controlling said prior art system is well known.

Figure 2:
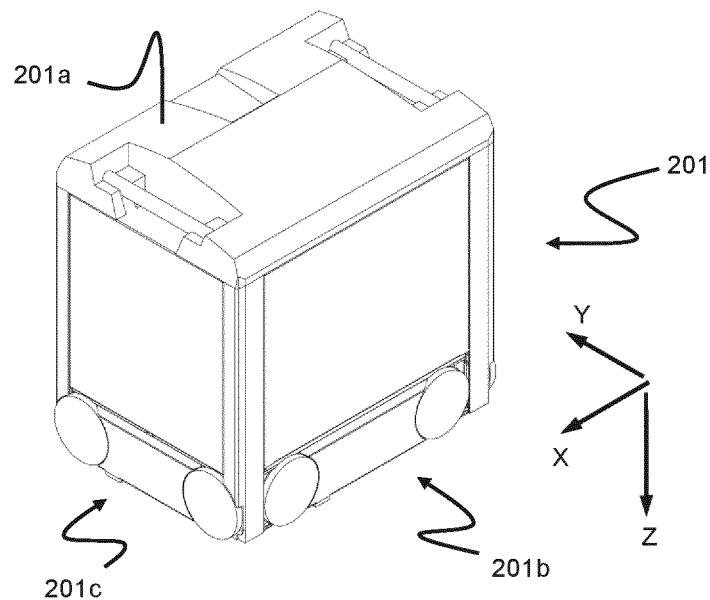
FIG. 2 is a perspective view of a prior art container handling vehicle having a centrally arranged cavity for containing storage containers therein.

FIG. 2 is a perspective view of a prior art container handling vehicle having a centrally arranged cavity for containing storage containers therein.

Figure 3:
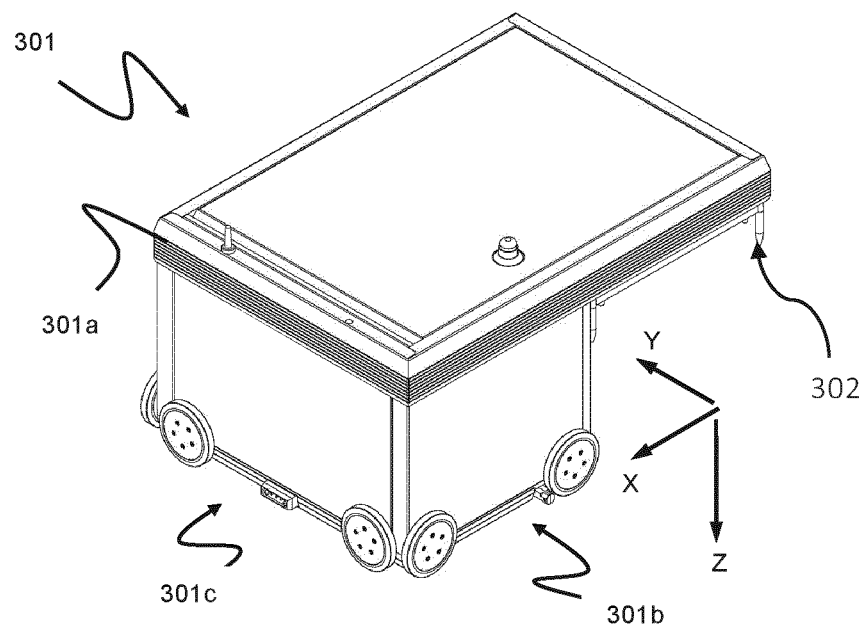
FIG. 3 is a perspective view of a prior art container handling vehicle having a cantilever for containing storage containers underneath.

FIG. 3 is a perspective view of a prior art container handling vehicle having a cantilever for containing storage containers underneath.

Figure 4:
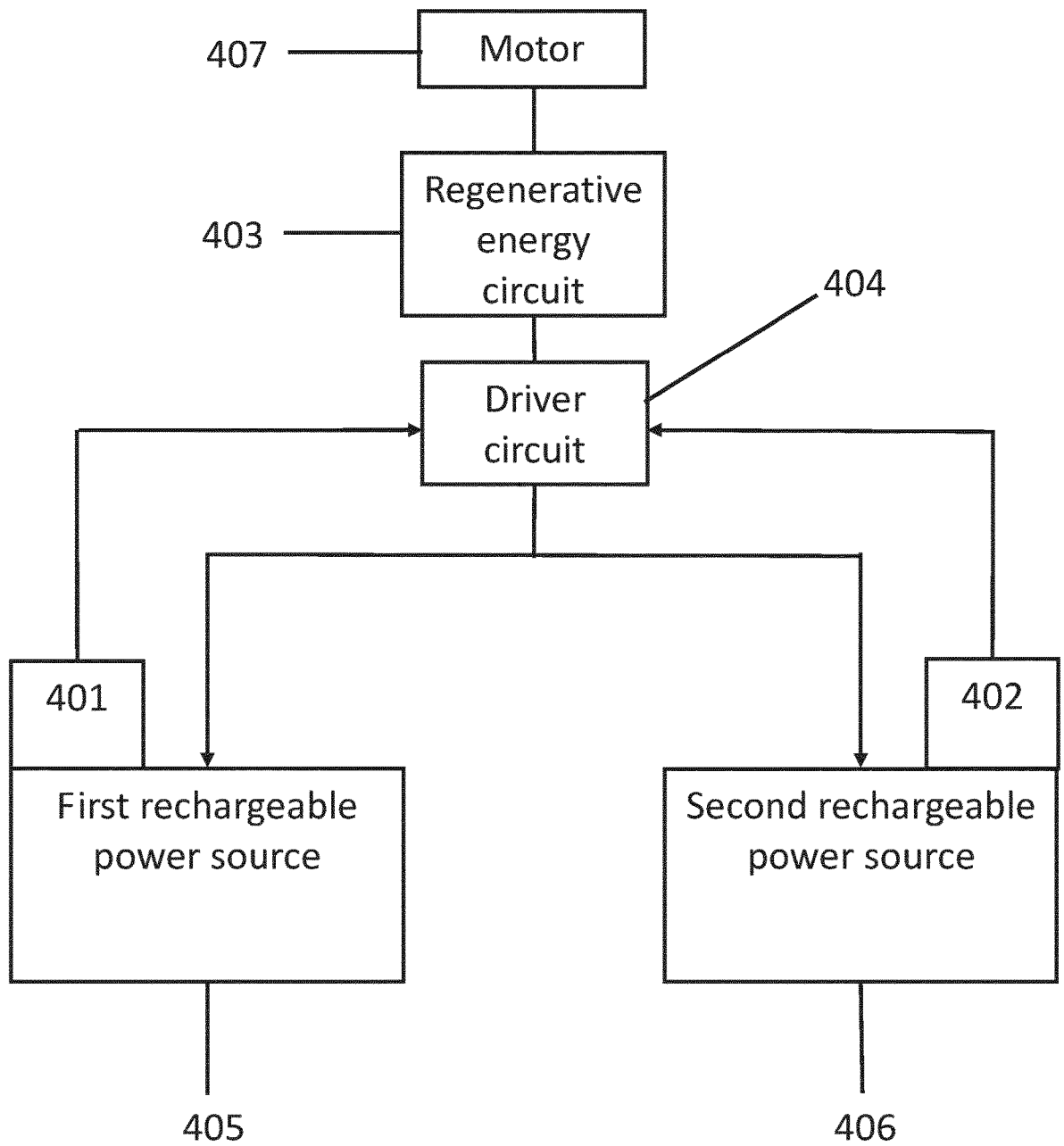
FIG. 4 is a box drawing of how the different parts of the system are connected according to a preferred embodiment of the present invention.

FIG. 4 is a box drawing of how the different parts of the system are connected according to a preferred embodiment of the present invention. The motor 407 and regenerative charging circuit for harvesting the energy harvests energy due to regenerative braking. In the present invention, regenerative braking can occur when the lifting frame is lowered down. Due to the weight of the lifting frame, both with or without a container attached, gravity will pull the lifting frame down without the motor 407 doing any work. Hence kinetic energy is generated from the change in potential energy. The kinetic energy from the lifting frame being lowered into the underlying storage system forces the rotor of the electric motor 407 to rotate. This rotation allows the electric motor 407 to work as a generator. The motor 407 can now harvest energy by converting the kinetic energy of the rotor into electrical energy. This electrical energy can again be stored in the rechargeable power sources.

A driver circuit 404 with a controller attached controls the motor 407. This driver circuit 404 further comprises a regenerative energy circuit 403. This regenerative energy circuit 403 is configured to harvest the electric energy generated by the motor 407. Further the driver circuit 404 directs the harvested energy to either the first or the second rechargeable power sources according to the levels of charge in the rechargeable power sources. To keep track of the charge levels of the rechargeable power sources a charge sensor 401, 402 is attached to the first and the second rechargeable power source 405, 406. The charge sensor 401, 402 communicates the charge level of the first and the second rechargeable power source 406 to the driver circuit 404.

In a preferred embodiment of the present invention the first rechargeable power source 405 can be a rechargeable battery 405. The rechargeable battery 405 can be a Li-ion battery. The second rechargeable power source 406 can be a capacitor 406. The capacitor 406 can be a supercapacitor.

Any other type of rechargeable battery and capacitor can be used.

Figure 5:
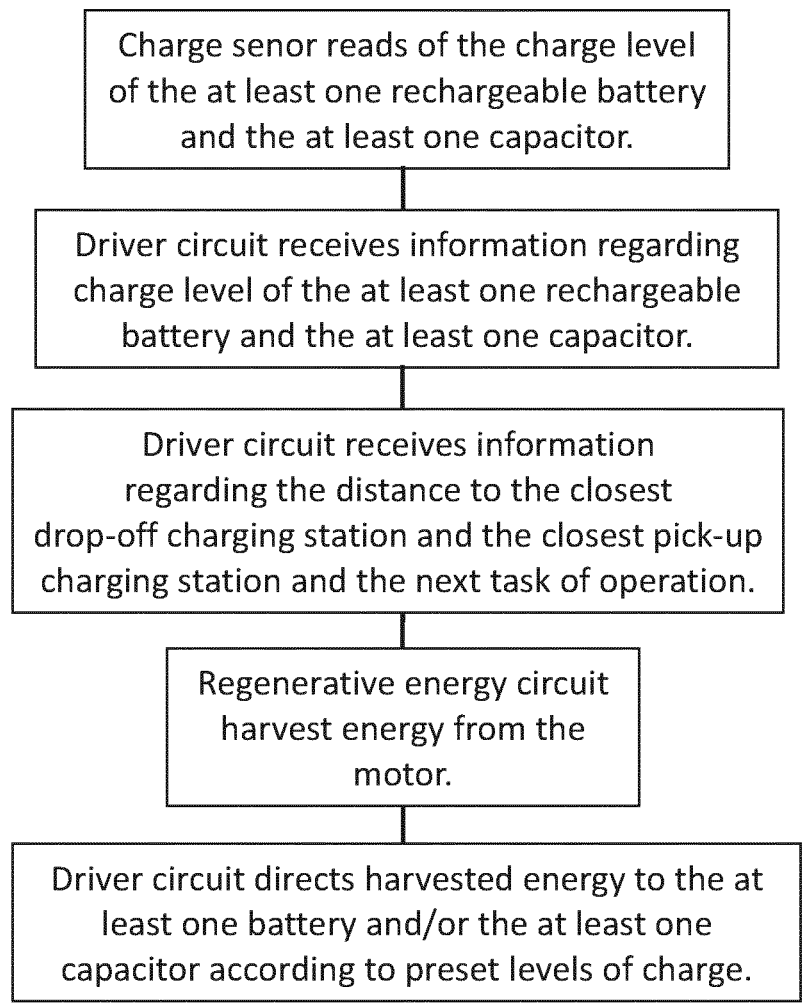
FIG. 5 is a flow chart of a process, according to an embodiment of the present invention, wherein the generated energy is directed to either of the rechargeable power sources depending on preset capacity levels.

FIG. 5 is a flow chart of a process, according to an embodiment of the present invention, wherein the harvested energy is directed to either of the rechargeable power sources depending on algorithms determining when to charge the Li-ion battery and when to charge the capacitor.

The driver circuit 404 comprises a regenerative energy circuit 403. The regenerative energy circuit 403 harvests energy from the motor during regenerative braking.

A charge sensor 401, 402 is connected to either of the rechargeable power sources 405, 406. The charge sensor 401, 402 reads of the charge level of the power sources 405, 406. This information is communicated to the driver circuit 404.

In an embodiment of the present invention a drop-off charging station is a charging station where the container handling vehicle places discharged batteries. A pick-up charging station is a charging station where the container handling vehicle picks up charged batteries.

Based on the information transmitted to the driver circuit 404 from the charge sensors 401, 402 and information on how far it is to the closest drop-off charging station and the closest pick-up charging station and the next operational task, the harvested energy is transmitted to either the first or the second rechargeable power source to ensure that the container handling vehicle has sufficient power to either perform the next operational task or drive to a charging station. Alternatively, harvested energy can be split between the two rechargeable power sources.

An algorithm determining if the harvested energy is to be sent to either the first or the second rechargeable power source is in one embodiment based on preset charging levels of the first and second rechargeable power sources.

In an embodiment of the present invention the decision to direct the harvested energy to either the battery or the capacitor or both is based on information received by the driver circuit. The information is gathered from the charge sensors attached to either of the rechargeable power sources. The charge sensors deliver information of what charge level the two power sources are at. The main object of the system is to ensure that the Li-ion battery is not overcharged or damaged through charging it too much too fast, risking fire or explosions. However, there is a further object which is to ensure that the battery has enough power to get the container handling vehicle to the drop-off charging station and that the capacitor has enough energy to ensure that the container handling vehicle can get from the drop-off charging station to the pick-up charging station.

In order to make these decisions, the container handling vehicle always needs to know the charge level of the two rechargeable power sources, the distance to the closest drop-off charging station, and the distance to the closest pick-up charging station and the next task of operation. Other information used in the algorithm may include how far it is to the next pick-up point of a container and how far it is between the pick-up point and the drop-off point of the container, as well as how deep the container handling vehicle needs to dig and the weight of the container that needs to be lifted and transported.

The information regarding the charging level of the rechargeable batteries is provided by the charge sensors connected to both the Li-ion battery and the capacitor. The information regarding the closest drop-off charging station and the closest pick-up charging station is provided to the container handling vehicle by a central computer system through e.g. Wi-Fi communication. The information regarding the next task of operation is also provided by the central computer system.

The central computer system transmits information regarding the next task of operation and the container handling vehicles calculates, based on the given information and the information gathered by the charge sensors, if it can take on the next task. If a container handling vehicle can take on the next task it communicates to the central computer system that it takes the next task of operation. If, however it cannot take on the next task of operation it communicates to the central computer system that it needs to change battery.

If a container handling vehicle has too low charge level on the battery to handle the next task of operation, but has high charge level on the capacitor, the container handling vehicle makes the decision to change the battery.

Alternatively, the container handling vehicle can use the capacitor to charge the battery if that ensures that the battery has enough power to complete the task, and the harvested energy from the lowering of the lifting frame can be used to charge the capacitor.

If the container handling vehicle has low charge level on the capacitor but high charge level on the battery the container handling vehicle can direct the energy harvested from the lowering of the lifting frame to the capacitor. Alternatively, the battery can be used to top up the capacitor.

If the container handling vehicle has high charge level on the battery and high charge level of the capacitor the harvested energy can be divided between the two rechargeable power sources. The division of how much is to be sent to the battery and how much is to be sent to the capacitor is made on current charge levels of the individual power sources. In an embodiment of the present invention the charge level of the battery should be kept within the range of 25%-75% of full charging level.

If the charge level of the battery is below 25% of the full charging capacity, the battery can be changed, or the harvested energy can be directed to the battery in order to make sure that the battery stays within its best working range. If the charge level of the battery is within 25%-75% of the full charging capacity the harvested energy can be directed to the battery in order to keep it within its best working range. If the charge level of the battery is above 75% of the full charging level the harvested energy can be sent to the capacitor.

Alternatively, if the charge levels of the two rechargeable power sources are at their full current charging level the container handling vehicle can decide to not harvest the energy generated from the lowering of the lifting frame.

If the container handling vehicle has low charge on battery and low charge on capacitor, the container handling vehicle will ensure that the capacitor has enough energy to maneuver from one charge point to another. Alternatively, the battery can be used to fully charge the capacitor if the battery has enough power left to ensure that it can manoeuvre the container handling vehicle to the closest drop-off charging station.

The purpose is to ensure that the combined power of the two rechargeable power sources always has enough power to transport the container handling vehicle to the closest drop-off charging station and from the closest drop-off charging station to the closest pick-up charging station.

The rules for when to charge the rechargeable battery and when to charge the capacitor stated above is not meant to be exclusive, but an example of a set of rules. Other rules can be used and are within the scope of the invention.

Figure 6:
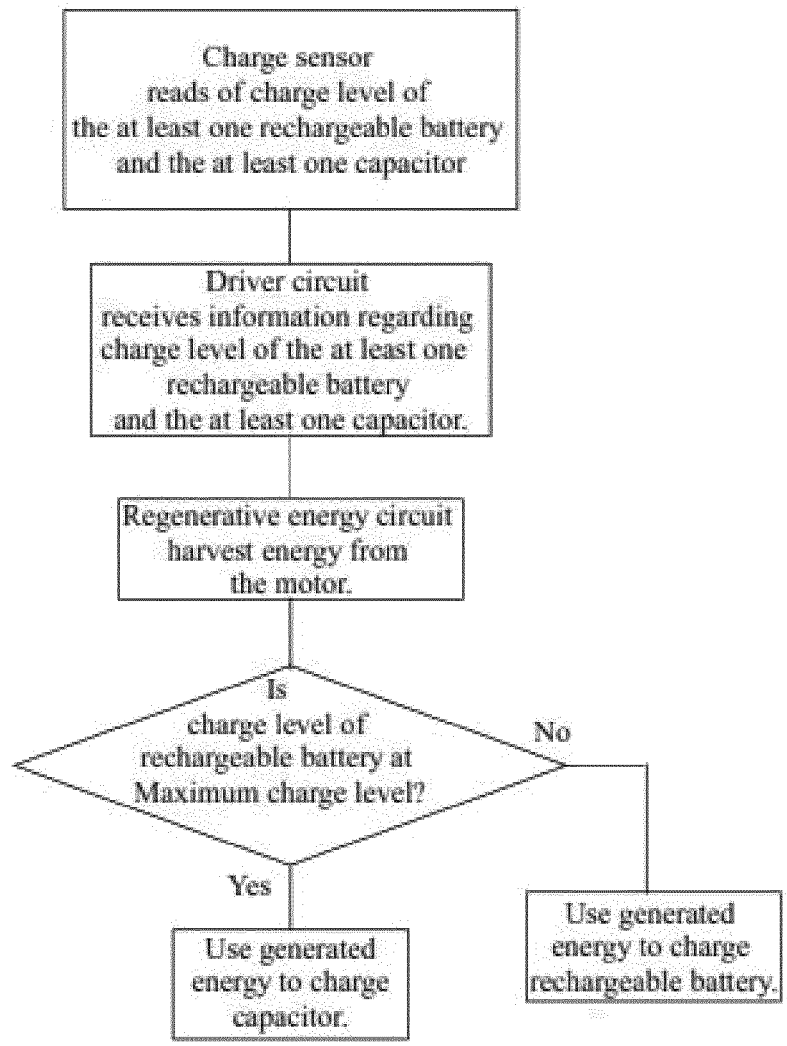
FIG. 6 is a flow chart of a process, according to an embodiment of the present invention, wherein the generated energy is directed to the capacitor if the rechargeable battery is at 100% of its current charging level.

FIG. 6 is a flow chart of a process, according to an embodiment of the present invention, wherein the harvested energy is directed to the capacitor 406 if the rechargeable battery 405 is at 100% of its current charging level.

As stated earlier if a Li-ion battery is overcharged, lithium ions can build up on the anode as metallic lithium, this is called lithium plating. Lithium plating degrades the battery's lifetime and durability. It can also lead to a short circuit which again might lead to a fire.

Hence in order to avoid the buildup of lithium plating, a safety measure is built into the system. If the battery is in danger of being overcharged the driver circuit 404 directs the harvested energy to the capacitor 406.

The battery is fully charged when it is at 100% of its current charging level. To overcharge it would be to try and charge the battery when it is at 100% of its current charge level. A battery's charging level may drop during its life time. However, 100% of its current charging level is to be considered as the maximum level of charge it can hold on any given time.

In an embodiment of the present invention the battery can be used to charge the capacitor 406 if the charge level of the capacitor 406 is lower than the set level for transporting the container handling vehicle between one charging station to the other.

LIST OF REFERENCE NUMBERS

Prior Art (FIGS. 1-4):
1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
401 Charge sensor
402 Charge sensor
403 Regenerative energy circuit
404 Driver circuit
405 Rechargeable power source
406 Rechargeable power source
407 Motor
X First direction
Y Second direction
Z Third direction

The invention claimed is:

1. A container-handling vehicle configured to move on a rail system arranged in a grid pattern across a top of a three-dimensional grid of an underlying storage system configured to store a plurality of stacks of storage container, wherein the rail system comprises a first set of parallel rails arranged in a horizontal plane (P) extending in a first direction (X) across the top of the three-dimensional grid, and a second set of parallel rails arranged in the horizontal plane (P) and extending in a second direction (Y) which is orthogonal to the first direction (X), wherein the first set of parallel rails and the second set of parallel rails form a grid pattern in the horizontal plane (P) comprising a plurality of adjacent grid cells, the container-handling vehicle comprising:
at least one lifting device for lifting storage containers from and lowering storage containers to the underlying storage system, said lifting device comprising a lifting frame for gripping a storage container, a winch system for lifting and lowering the lifting frame, a motor to drive the winch system and a driver circuit with a controller controlling the motor; and
at least a first rechargeable power source and a second rechargeable power source for providing power to the motor,
wherein the driver circuit further comprises a regenerative energy circuit configured to harvest energy from the motor when the lifting frame is lowered into the storage system, the driver circuit is configured to control and direct harvested energy to the first rechargeable power source and/or the second rechargeable power source according to preset levels of charge in the first rechargeable power source and the second rechargeable power source, and wherein the driver circuit is further connected to charge sensors connected to the first rechargeable power source and/or the second rechargeable power source.

2. The container-handling vehicle according to claim 1, wherein the first rechargeable power source is a Li-ion battery, and the second rechargeable power source is a capacitor.

3. The container-handling vehicle according to claim 2, wherein said driver circuit is configured to direct the energy harvested by the regenerative energy circuit to the capacitor if the first rechargeable power source is greater than 75% of a full charge level.

4. The container-handling vehicle according claim 2, wherein said driver circuit is configured to direct the energy harvested by the regenerative energy circuit to the first rechargeable power source if the first rechargeable power source is below 75% of a full charge level.

5. The container-handling vehicle according claim 2, wherein said driver circuit is configured to direct the energy harvested by the regenerative energy circuit to the first rechargeable power source and to the capacitor if both the first rechargeable power source and the second rechargeable power source are below 50% of a full charge level.

6. The container-handling vehicle according to claim 2, wherein the capacitor is a capacitor using electrochemical and/or electrostatically charge storage.

7. The container-handling vehicle according to claim 1, where the regenerative energy circuit further is configured to harvest energy from motors driving wheels of the container-handling vehicle for generating energy when the container-handling vehicle decelerates.

8. A method for harvesting energy when a container-handling vehicle is moving on a rail system arranged in a grid pattern across a top of a three-dimensional grid of an underlying storage system configured to store a plurality of stacks of storage container, the rail system comprising a first set of parallel rails arranged in a horizontal plane (P) extending in a first direction (X) across the top of the three-dimensional grid, and a second set of parallel rails arranged in the horizontal plane (P) and extending in a second direction (Y) which is orthogonal to the first direction (X), wherein the first set of parallel rails and the second set of parallel rails form a grid pattern in the horizontal plane (P) comprising a plurality of adjacent grid cells, wherein the container-handling vehicle comprises a vehicle body with at least a first set of wheels for moving the container-handling vehicle in a first direction (X), at least a first rechargeable power source and a second rechargeable power source, a driver circuit for controlling a charging level of the first rechargeable power source and the second rechargeable power source, at least one lifting device for lifting storage containers from and lowering storage containers to the underlying storage system, wherein said lifting device comprises a lifting frame for gripping a storage container, a winch system for lifting and lowering the lifting frame, a motor to drive the winch system, and a driver circuit with a controller controlling the motor, wherein the driver circuit is further connected to charge sensors connected to the first rechargeable power source and/or the second rechargeable power source; the method comprises:

connecting the motor and a regenerative energy circuit to the lifting device;

lowering the lifting device into the underlying storage system, and directing generated energy to the first rechargeable power source and/or the second rechargeable power source using the driver circuit.

9. The method according to claim 8, wherein the second rechargeable power source is a capacitor, and wherein the method further comprises directing energy harvested by the regenerative energy circuit to the capacitor if the first rechargeable power source is at a full current charging level.

10. The method according to claim 8, further comprising directing energy harvested by the regenerative energy circuit to the first rechargeable power source if the first rechargeable power source is below 75% of a full charge level.

* * * * *